United States Patent
Amano

(10) Patent No.: US 7,258,355 B2
(45) Date of Patent: Aug. 21, 2007

(54) VEHICULAR REAR SUSPENSION SYSTEM

(75) Inventor: Hidetoshi Amano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 348 days.

(21) Appl. No.: 11/055,015

(22) Filed: Feb. 11, 2005

(65) Prior Publication Data

US 2005/0275183 A1    Dec. 15, 2005

(30) Foreign Application Priority Data

Feb. 13, 2004  (JP)  ............................. 2004-036608

(51) Int. Cl.
*B60G 3/04* (2006.01)
(52) U.S. Cl. .................. 280/124.134; 280/124.135; 280/124.136
(58) Field of Classification Search ......... 280/124.111, 280/124.117, 124.128, 124.134, 124.135, 280/124.136, 124.145
See application file for complete search history.

(56) References Cited

U.S. PATENT DOCUMENTS

| | | | | |
|---|---|---|---|---|
| 4,616,847 A | * | 10/1986 | Kanai et al. ............. | 280/5.504 |
| 4,650,211 A | * | 3/1987 | Tanahashi ............. | 280/124.144 |
| 4,930,805 A | * | 6/1990 | Takata et al. .......... | 280/124.128 |
| 4,968,056 A | * | 11/1990 | Haraguchi ........... | 280/124.138 |
| 5,000,477 A | * | 3/1991 | Minakawa et al. ... | 280/124.136 |
| 5,005,856 A | * | 4/1991 | Shibahata ............ | 280/124.128 |
| 5,058,918 A | * | 10/1991 | Nakaya et al. ........ | 280/124.136 |
| 5,868,410 A | * | 2/1999 | Kawabe et al. ........ | 280/124.15 |
| 6,113,120 A | * | 9/2000 | Heap .................... | 280/124.135 |
| 6,116,627 A | * | 9/2000 | Kawabe et al. ........ | 280/124.15 |
| 6,123,351 A | * | 9/2000 | Bruehl ................ | 280/124.135 |
| 6,719,314 B1 | * | 4/2004 | Schote ................ | 280/124.135 |
| 6,997,468 B2 | * | 2/2006 | Ziech et al. ........... | 280/93.512 |
| 7,118,119 B2 | * | 10/2006 | Amanuma ........... | 280/124.135 |
| 2005/0140110 A1 | * | 6/2005 | Lee et al. ............. | 280/124.109 |

FOREIGN PATENT DOCUMENTS

| | | |
|---|---|---|
| JP | 61-3006 | 1/1986 |
| JP | 61-3007 | 1/1986 |
| JP | 61-3008 | 1/1986 |
| JP | 6-278429 | 10/1994 |
| JP | 7-186649 | 7/1995 |

* cited by examiner

*Primary Examiner*—Paul N. Dickson
*Assistant Examiner*—Toan C. To
(74) *Attorney, Agent, or Firm*—Arent Fox, LLP

(57) ABSTRACT

A vehicular rear suspension system includes an upper arm, a lower arm, and a control arm, each of which is connected to a knuckle. A straight line passing through a ball joint and a rubber bushing joint intersects the road surface at an intersection point that is positioned behind a ground contact point of the rear wheel in the longitudinal direction of the vehicle body. The ball joint connects the upper arm to the knuckle, and the rubber bushing joint connects the lower arm to the knuckle. Longitudinal elastic coefficients of the three arms are set in a predetermined relationship. Therefore, the intersection point at which an elastic kingpin intersects the road surface is positioned without fail behind a point of action of a lateral force when turning in the longitudinal direction of the vehicle body to achieve a lateral force toe-in and enhanced steering stability of the vehicle.

1 Claim, 6 Drawing Sheets

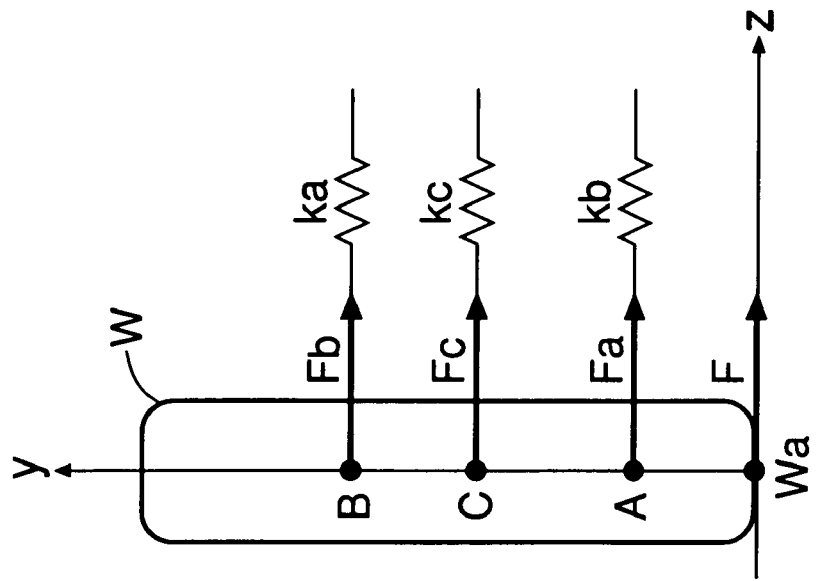
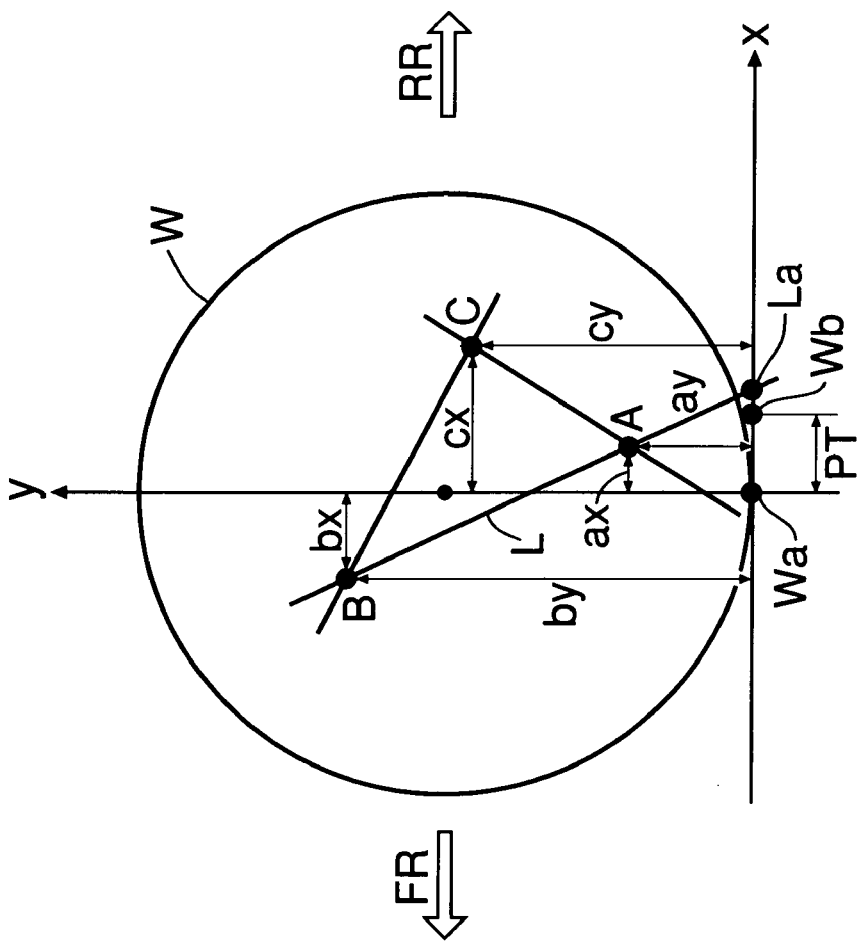
FIG.4A
FIG.4B

VEHICULAR REAR SUSPENSION SYSTEM

RELATED APPLICATION DATA

The present invention is based upon Japanese priority application No. 2004-36608, which is hereby incorporated in its entirety herein by reference.

BACKGROUND OF THE INVENTION

1. Field of the Invention

The present invention relates to a vehicular rear suspension system which includes a knuckle rotatably supporting a rear wheel via an axle, a trailing arm extending from a joint on a vehicle body in the longitudinal direction of the vehicle body and connected to the knuckle, and three lateral arms extending from joints on the vehicle body in the lateral direction of the vehicle body and connected to the knuckle.

2. Description of the Related Art

Japanese Patent Application Laid-open No. 7-186649 discloses a multi-link suspension system which includes a trailing arm, a leading arm, an upper arm, a lower arm, and a control arm.

In the known multi-link suspension system, high caster rigidity and high longitudinal compliance are achieved by imparting a modulus of elasticity that is relatively high in the tensile direction and relatively low in the compressive direction to an elastic bushing. At least one of a connecting part between the leading arm and a knuckle and a connecting part between the leading arm and a vehicle body is provided with the elastic bushing.

In a suspension system equipped with three lateral arms, that is, an upper arm, a lower arm, and a control arm, the position of an elastic kingpin is determined based on the arrangement and the rigidity of each lateral arm in the lateral direction of a vehicle body. In particular, the rigidity of the lateral arms in the lateral direction of the vehicle body is determined based on the elastic coefficient of rubber bushing joints connecting opposite ends of the lateral arms to the vehicle body and a knuckle. However, where the elastic coefficient changes from a designed value, the position of the elastic kingpin is displaced from a designed position. Furthermore, when a lateral force acts from the road surface on a rear wheel during turning of the vehicle, rear wheel toe-out occurs, leading to a degradation in steering stability.

SUMMARY OF THE INVENTION

The present invention has been accomplished under the above-mentioned circumstances. It is an aspect of the present invention to reliably achieve a lateral force toe-in, and to do so even when the rigidity of three lateral arms in the lateral direction of a vehicle body changes from a predetermined value.

In accordance with a first aspect of the present invention, a vehicular rear suspension system includes: a knuckle rotatably supporting a rear wheel via an axle; a trailing arm extending from a joint on a vehicle body in the longitudinal direction of the vehicle body and connected to the knuckle; and first, second and third lateral arms extending from joints on the vehicle body in the lateral direction of the vehicle body and connected to the knuckle. A straight line passing through a first joint and a second joint intersects the road surface at an intersection point positioned in the rear of a ground contact point of the rear wheel in the longitudinal direction of the vehicle body. The first joint connects the first lateral arm to the knuckle, wherein the first lateral arm is disposed at the highest position relative to the three lateral arms. The second joint connects the second lateral arm to the knuckle, wherein the second lateral arm, relative to the other two lateral arms, is disposed on the forward side of the vehicle body. Elastic coefficients kb, ka, and kc of the first, second and third lateral arms, respectively, are set so that kc<kakbA/(-kaB-kbC) if kb<-kaB/C, and kc>kakbA/(-kaB-kbC) if kb>-kaB/C. It should be noted that kb is a longitudinal elastic coefficient of the first lateral arm having joints at opposite ends thereof, ka is a longitudinal elastic coefficient of the second lateral arm also having joints at opposite ends thereof, and kc is a longitudinal elastic coefficient of the third lateral arm having joints at opposite ends thereof. In x-y coordinates having the x-axis extending in the longitudinal direction of the vehicle body and the y-axis extending in the vertical direction of the vehicle body, the coordinates of the first joint are (bx, by), the coordinates of the second joint are (ax, ay), and the coordinates of the third joint, connecting the third lateral arm to the knuckle, are (cx, cy), wherein A=(-ay+by)(-aybx+axby), B=(-ay+cx)(-aycx+axcy), and C=(-by+cy)(-bycx+bxcy).

An upper arm, a lower arm and a control arm of an embodiment of the present invention correspond, respectively, to the first, second and third lateral arms. A ball joint, a rubber bushing joint, and a ball joint of the present invention correspond to the first, second and third joints. Rubber bushing joints of the present invention correspond to the joints.

With the arrangement of the first aspect, the straight line passing through the first joint connecting the knuckle to the first lateral arm which is disposed at the highest position relative to all three lateral arms, and the second joint connecting the knuckle to the second lateral arm, which, relative to the other two lateral arms, is positioned on the forward side of the vehicle body, intersects the road surface at the intersection point located behind the ground contact point of the rear wheel in the longitudinal direction of the vehicle body. The longitudinal elastic coefficients of the first, second, and third lateral arms are set in a predetermined relationship. Therefore, the intersection point at which the elastic kingpin intersects the road surface is accurately positioned toward the rear of the vehicle body relative to a point of action of a lateral force when turning. As such, a lateral toe-in force is reliably achieved while the steering stability of the vehicle is enhanced. Moreover, because of the above-mentioned arrangement for the first, second and third lateral arms, the lateral toe-in force is achieved without decreasing the elastic coefficient of the second lateral arm, which is at a relatively low position, wherein the lateral rigidity of the ground contact point of the rear wheel is enhanced.

BRIEF DESCRIPTION OF THE DRAWINGS

The present invention is explained below with reference to an embodiment of the present invention shown as illustrated in the attached drawings.

FIGS. 4A and 4B are schematic diagrams illustrating an analytical model of a suspension system;

DESCRIPTION OF THE PREFERRED EMBODIMENT

Figure 1:
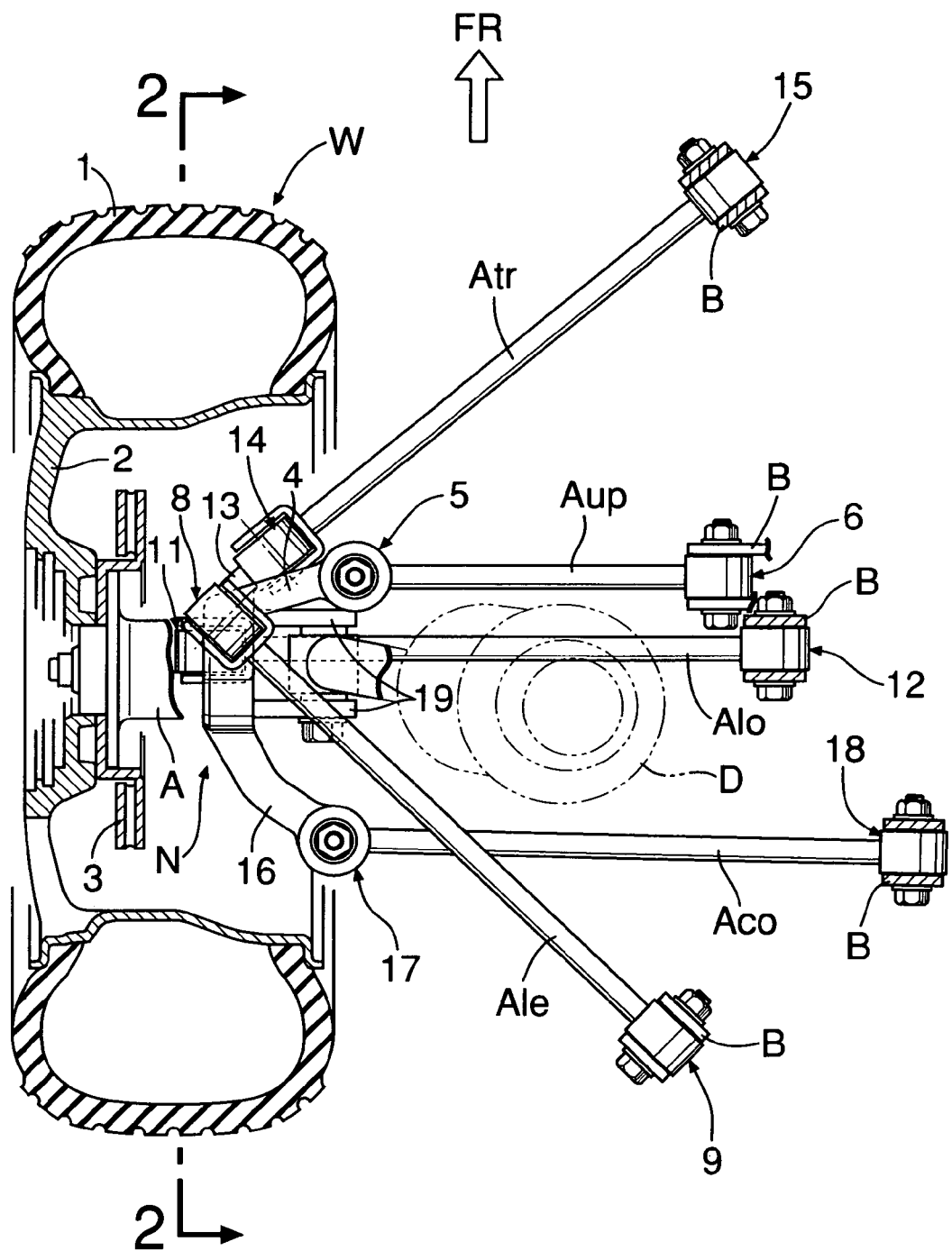
FIG. 1 is a plan view of a multi-link suspension.
Figure 2:
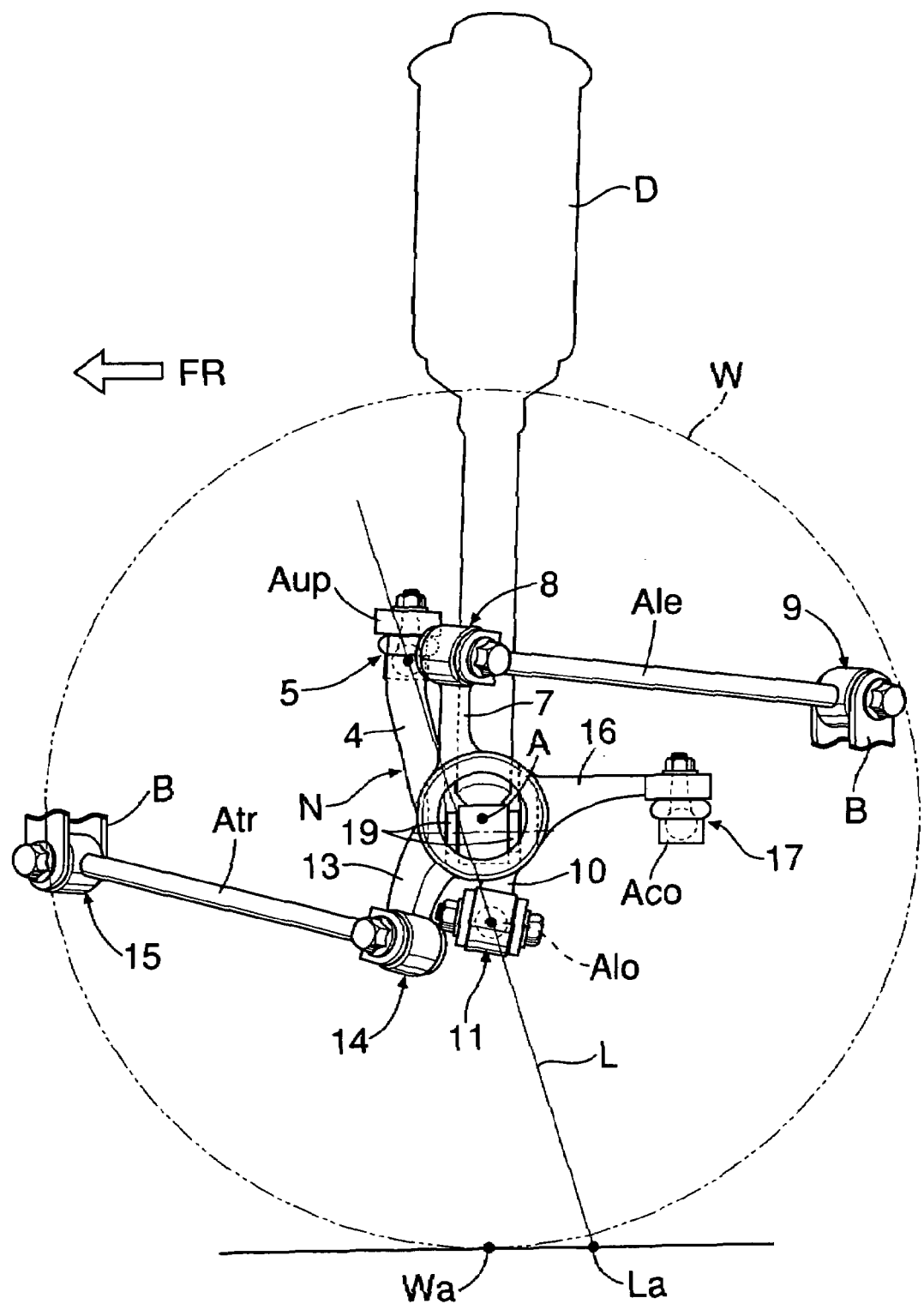
FIG. 2 is a view taken from line 2-2 in FIG. 1.

FIG. 1 and FIG. 2 show a multi-link suspension system for a rear wheel W on the left side of a front-wheel-drive vehicle. The rear wheel W, which includes a tire 1, a wheel body 2, and a brake disk 3, is rotatably supported by a knuckle N via an axle A. The outer and inner ends of an upper arm Aup are connected, respectively, to an upper arm mount 4 projecting upward from the knuckle N and a vehicle body B via a ball joint 5 and a rubber bushing joint 6. The outer and inner ends of a leading arm Ale are connected, respectively, to a leading arm mount 7 projecting upward from the knuckle N and the vehicle body B via rubber bushing joints 8 and 9. The upper arm Aup and the leading arm Ale are positioned in substantially the same horizontal plane above the axle A. The upper arm Aup extends in the lateral direction of the vehicle body. The leading arm Ale extends from the rear inner side of the vehicle body to the front outer side of the vehicle body.

The outer and inner ends of a lower arm Alo are connected, respectively, to a lower arm mount 10 projecting downward from the knuckle N and the vehicle body B via rubber bushing joints 11 and 12. The inner and outer ends of a trailing arm Atr are connected, respectively, to a trailing arm mount 13 projecting downward from the knuckle N and the vehicle body B via rubber bushing joints 14 and 15. The lower arm Alo and the trailing arm Atr are positioned in substantially the same horizontal plane beneath the axle A. The lower arm Alo extends in the lateral direction of the vehicle body. The trailing arm Atr extends from the front inner side of the vehicle body to the rear outer side of the vehicle body.

The outer and inner ends of a control arm Aco are connected, respectively, to a control arm mount 16 projecting rearward from the knuckle N and the vehicle body B via a ball joint 17 and a rubber bushing joint 18. The control arm Aco extends laterally relative to a longitudinal axis of the vehicle body and at a vertical height disposed halfway between the upper arm Aup and the lower arm Alo.

The lower end of a damper D, having the upper end thereof supported by the vehicle body B, is connected to a damper mount 19 projecting inward from the knuckle N toward the center of the vehicle body. The upper end (i.e., the part mounted on the vehicle body B of the damper D) is displaced rearward relative to the lower end, and the lower end (i.e., the part mounted on the knuckle N and an upper part of the damper D) is slightly inclined in a rearward direction.

Among the upper arm Aup, the lower arm Alo, and the control arm Aco, which extend in the lateral direction of the vehicle body, the upper arm Aup, which is disposed above and in front of the axle A, forms the first lateral arm of the present invention. The lower arm Alo, which is disposed beneath the axle A, forms the second lateral arm of the present invention. The control arm Aco, which is disposed to the rear of the axle A, forms the third lateral arm of the present invention. The ball joint 5, connecting the upper arm Aup to the knuckle N, forms the first joint of the present invention. The rubber bushing joint 11, connecting the lower arm Alo to the knuckle N, forms the second joint of the present invention. The ball joint 17, connecting the control arm Aco to the knuckle N, forms the third joint of the present invention.

As shown in FIG. 2, a straight line L, passing through the ball joint 5 and the rubber bushing joint 11, intersects the road surface at an intersection point La that is located rearward or behind a ground contact point Wa where the rear wheel W contacts the road surface in the longitudinal direction of the vehicle body. The remaining control arm Aco is positioned behind the straight line L in the longitudinal direction of the vehicle body.

The outer rear wheel W receives an increased contact patch load when the vehicle turns, as well as a lateral force from the contact point with the road surface that is directed inward. If the lateral force generates a moment that causes the outer rear wheel W to toe-in, the stability of the vehicle, when turning, is improved. In a rear suspension system having no actual kingpin, since the rear wheel W changes the toe with an elastic kingpin K as the center, if the distance between an intersection point Ka at which the elastic kingpin K intersects the road surface and the ground contact point Wa of the rear wheel W, that is, a caster trail CT of the elastic kingpin K (hereinafter, simply called the caster trail CT), is positive (i.e., the intersection point Ka at which the elastic kingpin K intersects with the road surface is rearward or behind the ground contact point Wa of the rear wheel W in the longitudinal direction of the vehicle body), a lateral force toe-in, when turning, is achieved.

Figure 3:
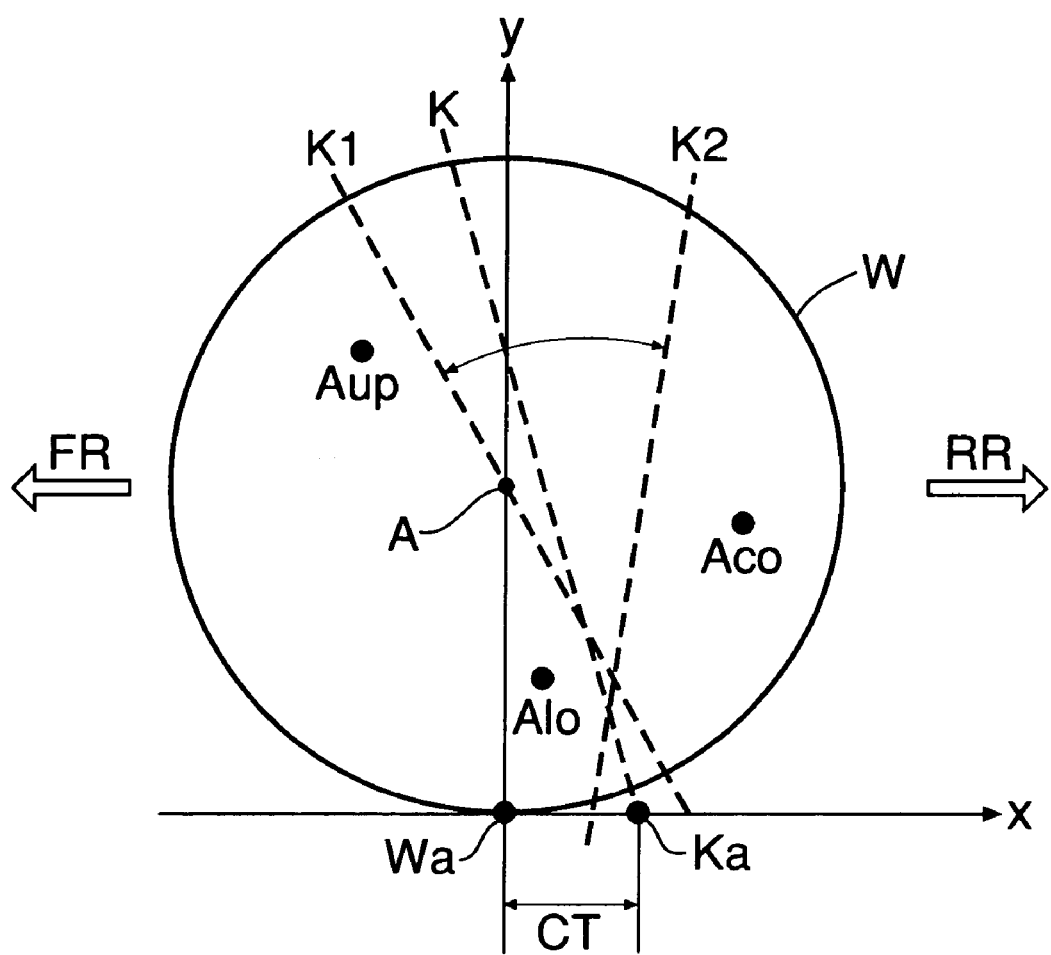
FIG. 3 is a schematic diagram used to explain an elastic kingpin and a caster trail.

FIG. 3 is a schematic diagram which shows the arrangement of the upper arm Aup, the lower arm Alo, and the control arm Aco. The position of the elastic kingpin K changes depending on the longitudinal rigidities of the upper arm Aup, the lower arm Alo, and the control arm Aco. That is, the rigidity of the ball joint 5 and the rubber bushing joint 6 at opposite ends of the upper arm Aup, the rigidity of the rubber bushing joints 11 and 12 at opposite ends of the lower arm Alo, and the rigidity of the ball joint 17 and the rubber bushing joint 18 at opposite ends of the control arm Aco, and the caster trail CT is not always positive.

However, if the upper arm Aup, the lower arm Alo, and the control arm Aco are arranged as shown in FIG. 3, even if the rigidity of the rubber bushing joints significantly changes, since the elastic kingpin K moves in the range from K1 to K2, the caster trail CT is usually positive, and toe-in is achieved as a result of the lateral force.

Furthermore, the lateral arm making the largest contribution to the ground contact point lateral rigidity of the rear wheel W is the lower arm Alo which is the closest to the road surface. Increasing the longitudinal rigidity of the lower arm Alo increases the ground contact point lateral rigidity. For this reason, increasing the longitudinal rigidity of the lower arm Alo makes the elastic kingpin K rise toward K2 and the caster trail CT decrease. However, in accordance with the arrangement of the upper arm Aup, the lower arm Alo, and the control arm Aco, since the caster trail CT does not become negative, it is possible to prevent the lateral force from causing toe-out.

The operation of the rear suspension system is now explained using FIGS. 4A and 4B.

In FIGS. 4A and 4B, A indicates the position of the lower arm Alo (the position of the rubber bushing joint 11), B indicates the position of the upper arm Aup (the position of the ball joint 5), and C indicates the position of the control arm Aco (the position of the ball joint 17). Rectangular coordinates xyz are set with the ground contact point Wa of the rear wheel W as the point of origin, the x-axis extending toward the rear of the vehicle body, the y-axis extending toward the top of the vehicle body, and the z-axis extending toward the inside of the vehicle body. The x-y coordinates of point A are (ax, ay), the x-y coordinates of point B are (bx, by), and the x-y coordinates of point C are (cx, cy). Wb indicates the point of action of the lateral force at which the lateral force from the road surface acts on the rear wheel W. The distance between the point of action Wb of the lateral force and the ground contact point Wa of the rear wheel W is defined as a pneumatic trail PT.

Elastic coefficient ka denotes an elastic coefficient in the longitudinal direction (the z-axis direction) that includes the rubber bushing joints 11 and 12 at opposite ends of the lower arm Alo. Elastic coefficient kb denotes an elastic coefficient in the longitudinal direction (the z-axis direction) that includes the ball joint and the rubber bushing joint 6 at opposite ends of the upper arm Aup. Elastic coefficient kc denotes an elastic coefficient in the longitudinal direction (the z-axis direction) that includes the ball joint 17 and the rubber bushing joint 18 at opposite ends of the control arm Aco. Fa, Fb, and Fc denote loads in the z-axis direction that act on the lower arm Alo, the upper arm Aup, and the control arm Aco, respectively. F denotes a load in the z-axis direction (lateral force) that acts from the road surface on the rear wheel W. The load F acts on the point of action Wb of the lateral force which is behind the ground contact point Wa of the rear wheel W by a distance corresponding to the pneumatic trail PT.

In accordance with FIGS. 4A and 4B, because of the balance of the loads in the z-axis direction, the balance of moments around the x-axis, and the balance of moments around the y-axis, three equations shown in Expression 1 hold.

$$\begin{cases} Fa + Fb + Fc + F = 0 \\ Faay + Fbby + Fccy = 0 \\ Faax + Fbbx + Fccx + FPT = 0 \end{cases} \quad \text{(Expression 1)}$$

By solving the three equations shown in Expression 1 with respect to the loads Fa, Fb, and Fc acting on the point A, the point B, and the point C, the following three equations shown in Expression 2 are obtained.

$$\begin{cases} Fa = \dfrac{cy(bx - PT) - by(cx - PT)}{-Z} F \\ Fb = \dfrac{ay(cx - PT) - cy(ax - PT)}{-Z} F \\ Fc = \dfrac{by(ax - PT) - ay(bx - PT)}{-Z} F \end{cases} \quad \text{(Expression 2)}$$

Here, $Z = (bx - ax)(cy - ay) - (by - ay)(cx - ax)$.

The amount of flexing of each arm in the z-axis direction when the lateral force F acts thereon and the amount of inclination of the rotational plane of the rear wheel W are determined by the elastic coefficients ka, kb, and kc of the arms and the loads Fa, Fb, and Fc determined from Expression 2. When the normal to the rotational plane of the rear wheel W is viewed from above, the change in angle of the normal corresponds to the change in toe of the rear wheel W. In order to determine the change in toe of the rear wheel W, an inner product of a vector connecting the point A and the point B and a vector connecting the point A and the point C is calculated from Expression 3.

$$\vec{AB} \times \vec{AC} = (bx - ax, by - ay, bz - az) \times \quad \text{(Expression 3)}$$
$$(cx - ax, cy - ay, cz - az) =$$
$$\begin{pmatrix} (by - ay)(cz - az) - (cy - ay)(bz - az) \\ (bz - az)(cx - ax) - (bx - ax)(cz - az) \\ (bx - ax)(cy - ay) - (by - ay)(cx - ax) \end{pmatrix} \equiv \begin{pmatrix} X \\ Y \\ Z \end{pmatrix}$$

Here, $az = \dfrac{Fa}{ka}, \quad bz = \dfrac{Fb}{kb}, \quad cz = \dfrac{Fc}{kc}$.

In this way, the change in toe of the rear wheel W is given by $\tan^{-1} X/Z$ using the X-component and the Z-component of the normal vector calculated with Expression 3.

The thus-obtained change in toe of the rear wheel W, $\tan^{-1} X/Z$, can be converted into Expression 4 using Expression 2.

$$\tan(\text{toe}) = \quad \text{(Expression 4)}$$
$$\dfrac{\dfrac{1}{ka}(by - cy)\{by(cx - PT) - cy(bx - PT)\} +}{} $$
$$\dfrac{\dfrac{1}{kb}(cy - ay)\{cy(ax - PT) - ay(cx - PT)\} +}{}$$
$$\dfrac{\dfrac{1}{kc}(ay - by)\{ay(bx - PT) - by(ax - PT)\}}{-\{(axby - aybx) + (aycx - axcy) + (bxcy - bycx)\}^2} F$$

For ease of understanding, if it is assumed that the pneumatic trail PT=0, that is, the point of action Wb of the lateral force coincides with the ground contact point Wa of the rear wheel W, Expression 5 can be derived from Expression 4.

$$\tan(\text{toe}) = \frac{\dfrac{1}{ka}\underbrace{\dfrac{B}{(cy-by)(bxcy-bycx)}}_{\substack{\text{Negative} \\ \text{when } C \text{ is} \\ \text{lower than}}}\underbrace{\phantom{\dfrac{B}{(cy-by)(bxcy-bycx)}}}_{\substack{\text{Negative when} \\ \text{the } y \text{ intercept of} \\ \text{the line } BC \text{ is} \\ \text{positive}}} + \dfrac{1}{kb}\underbrace{\dfrac{C}{(ay-cy)(aycx-axcy)}}_{\substack{\text{Negative} \\ \text{when } A \text{ is} \\ \text{lower than}}}\underbrace{\phantom{\dfrac{C}{(ay-cy)(aycx-axcy)}}}_{\substack{\text{Negative when} \\ \text{the } y \text{ intercept of} \\ \text{the line } AC \text{ is} \\ \text{positive}}} + \dfrac{1}{kc}\underbrace{\dfrac{A}{(by-ay)(axby-aybx)}}_{\substack{\text{Positive} \\ \text{when } B \text{ is} \\ \text{higher than}}}\underbrace{\phantom{\dfrac{A}{(by-ay)(axby-aybx)}}}_{\substack{\text{Positive when} \\ \text{the } y \text{ intercept of} \\ \text{the line } AB \text{ is} \\ \text{positive}}}}{\underbrace{-\{(axby-aybx)+(aycx-axcy)+(bxcy-bycx)\}^2}_{\text{Denominator is always negative}}} F$$

(Expression 5)

The suspension system for the rear wheel W includes the following characteristics (1) and (2).

(1) Since the lower arm Alo (the point A in FIGS. 4A and 4B), which is the lowest, is mounted at a point far from a main frame, the rigidity of the mounting point (the elastic coefficient ka) easily deteriorates. Therefore, even when there is an unwanted decrease in the elastic coefficient ka, a lateral force toe-in should be generated. In other words, even when the rigidity of the mounting point of the lower arm Alo deteriorates, a decrease in the amount of lateral force toe-in should be avoided.

(2) The amount of lateral force toe-in should be increased by reducing the rigidity (the elastic coefficients kb and kc) of the mounting points of the upper arm Aup (the point B in FIGS. 4A and 4B) and the control arm Aco (the point C in FIGS. 4A and 4B) rather than the lower arm Alo, which is the lowest. This is because, if the rigidity (the elastic coefficient ka) of the mounting point of the lower arm Alo, which is the lowest, is lowered, the ground contact point lateral rigidity is significantly decreased, and the rigidity of the mounting point of the lower arm Alo should therefore be high.

In Expression 5, since the denominator is always negative, the larger the absolute value of the numerator when it is positive, the larger the lateral force toe-in. With regard to the requirement (1) above, in order to increase the amount of lateral force toe-in, even when the elastic coefficient ka of the lower arm Alo in the first term of the numerator is small, (cy−by)(bxcy−bycx) must be positive. In FIGS. 4A and 4B, since the point B and the point C are on opposite sides of the y-axis, (bxcy−bycx) is negative, and consequently, (cy−by) must also be negative. That is, the point C (the control arm Aco) should be at a position lower than the point B (the upper arm Aup).

With regard to the requirement (2) above, if the elastic coefficient ka of the lower arm Alo, which is the lowest, is decreased, there is a problem that the ground contact point lateral rigidity is significantly degraded. Also, if the elastic coefficient kb of the upper arm Aup, which is the highest, is decreased, there is a problem that the camber rigidity is greatly decreased. Therefore, the amount of lateral force toe-in should be increased by decreasing the elastic coefficient kc of the remaining control arm Aco. For this purpose, the third term of the numerator of Expression 5, (by−ay)(axby−aybx), must be positive. In FIGS. 4A and 4B, since the point B is at a position higher than the point A, (by−ay) is always positive, and it is therefore necessary for (axby−aybx) to be positive. In order for (axby−aybx) to be positive, it is sufficient if the y intercept of the straight line L connecting the point B and the point A is positive. In other words, the straight line L connecting the point B (the upper arm Aup) and the point A (the lower arm Alo) should intersect the road surface at an intersection point La that is behind the ground contact point Wa of the rear wheel W.

As hereinbefore described, if the straight line L, connecting the upper arm Aup and the lower arm Alo, intersects the road surface at a position behind the ground contact point Wa of the rear wheel W, and the control arm Aco is at a position lower than the upper arm Aup, the above-mentioned requirements (1) and (2) are satisfied. Thus, even if the rigidity of each joint of the upper arm Aup, the lower arm Alo, and the control arm Aco becomes lower than a value determined during design of the system, the caster trail CT does not change significantly. As a result, even if, in an attempt to reduce the weight, a flexible structure is employed for the mounting section of the lateral arm, such as a sub-frame, it is possible to prevent lateral force toe-out to maintain steering stabilities. It is also possible to increase the amount of lateral force toe-in by decreasing the rigidities of the rubber bushing joints 5 and 6 of the control arm Aco while securing a ground contact point lateral rigidity by maintaining a high rigidity for the rubber bushing joints 11 and 12 of the lower arm Alo which bears most of the lateral force.

The above-mentioned explanation assumes that the pneumatic trail PT=0, but, in reality, the point of action Wb of the lateral force is behind the ground contact point Wa and the pneumatic trail PT>0. Therefore, in order to secure a lateral force toe-in under any condition, such as if the rigidity of the mounting point of each lateral arm decreases, it is necessary for the intersection point Ka of the elastic kingpin K with the road surface to be behind the point of action Wb of the lateral force, that is, caster trail CT>pneumatic trail PT.

Since the elastic kingpin K is a group of points at which toe change does not occur even if a lateral force acts, if a pneumatic trail PT establishing tan (toe)=0 is determined in Expression 4 above which gives tan (toe), this pneumatic trail PT becomes the caster trail CT. Therefore, if the pneumatic trail PT is determined to be the caster trail CT and the rigidities of the upper arm Aup, the lower arm Alo, and the control arm Aco are set so that the caster trail CT>0, a lateral force toe-in can always be achieved. By solving Expression 4 with respect to the pneumatic trail PT (that is, the caster trail CT), Expression 6 below can be obtained.

$$CT = \frac{kakb\overbrace{\frac{A}{(-ay+by)(axby-aybx)}}^{\substack{\text{Positive} \\ \text{because } B \\ \text{is higher} \\ \text{than } A}}^{\substack{\text{Positive because} \\ \text{the } y \text{ intercept of} \\ \text{the line } AB \text{ is} \\ \text{positive}}} + kakc\overbrace{\frac{A}{(-ay+cy)(axcy-aycx)}}^{\substack{\text{Positive} \\ \text{because } C \\ \text{is higher} \\ \text{than } A}}^{\substack{\text{Positive because} \\ \text{the } y \text{ intercept of} \\ \text{the line } AC \text{ is} \\ \text{negative}}} + kbkc\overbrace{\frac{B}{(-by+cy)(bxcy-bycx)}}^{\substack{\text{Negative} \\ \text{because } C \\ \text{is lower} \\ \text{than } B}}^{\substack{\text{Negative because} \\ B \text{ and } C \text{ are on} \\ \text{opposite sides of} \\ \text{the y-axis}}}}{\underbrace{kakb(ay-by)^2 + kakc(ay-cy)^2 + kbkc(by-cy)^2}_{\text{Denominator is always positive}}}$$

(Expression 6)

Figure 5:
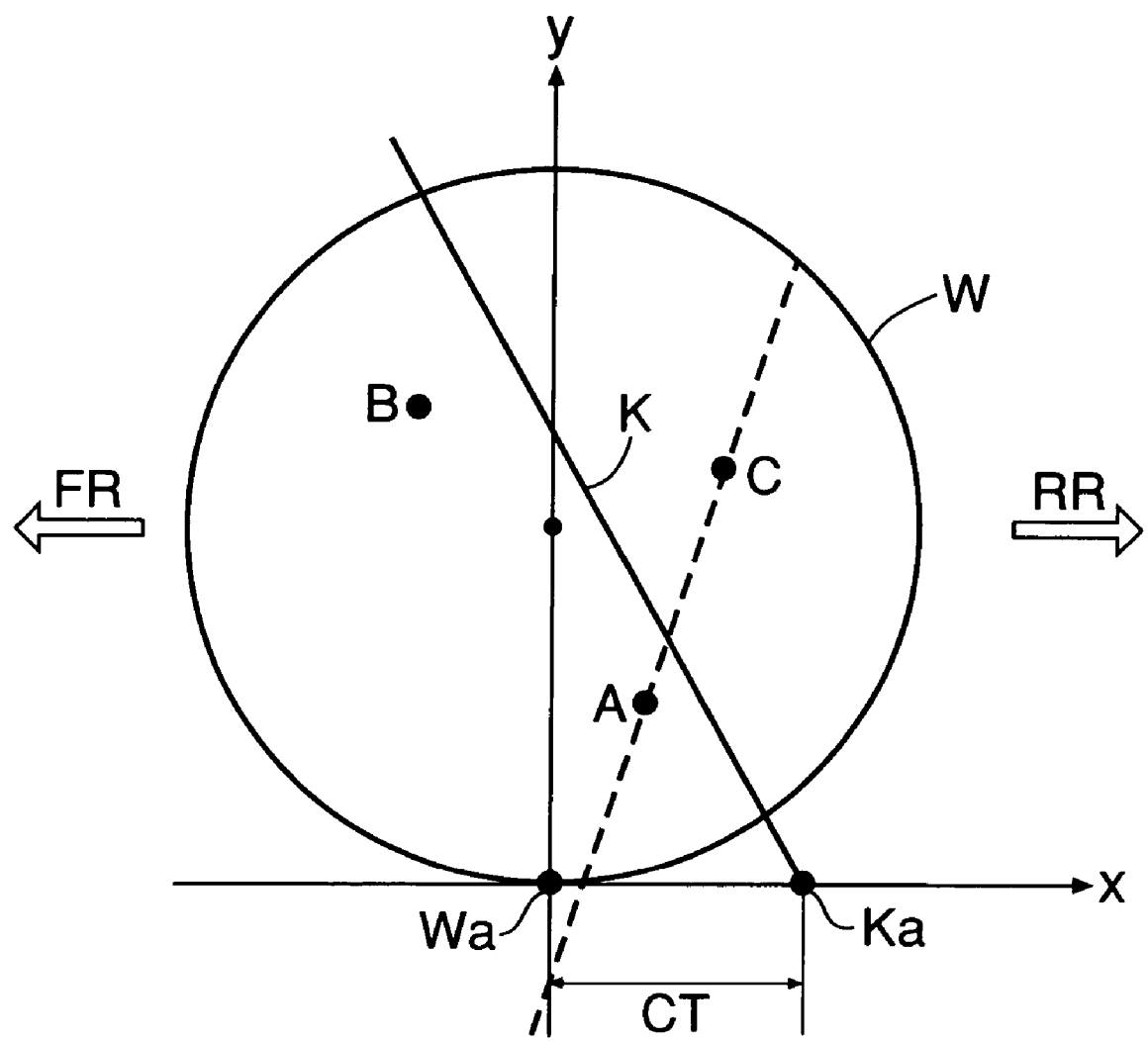
FIG. 5 is a schematic diagram explaining conditions under which pneumatic trail is always positive.

In Expression 6, for the caster trail CT to be more than 0, it is sufficient if the condition that the second term (axcy−aycx) of the numerator is positive. This condition means that, as shown in FIG. 5, the y intercept of the straight line connecting the point A (the lower arm Alo) and the point C (the control arm Aco) is negative. However, in order to achieve this arrangement, it is necessary for the point A (the lower arm Alo) to be disposed considerably toward the rear of the vehicle body, leading to a problem that the ground contact point lateral rigidity might be degraded.

To always achieve a lateral force toe-in in this way for any setting of the rigidities of the upper arm Aup, the lower arm Alo, and the control arm Aco is not practical since it results in the above-mentioned degradation in the ground contact point lateral rigidity. Therefore, conditions under which the caster trail CT>0 holds are determined while paying attention to the elastic coefficient kc of the control arm Aco. The reason for changing the elastic coefficient kc of the control arm Aco is that if the elastic coefficient kb of the upper arm Aup or the elastic coefficient ka of the lower arm Alo is changed, the camber rigidity or the ground contact point lateral rigidity is affected, and it is only the elastic coefficient kc of the control arm Aco that can be changed freely.

That is, the caster trail CT being >0 holds when the numerator of the right-hand side of Expression 6 is positive, as shown in Expression 7 below.

$CT = kakbA + kakcB + kbkcC > 0$

Here, $A = (-ay+by)(-aybx+axby)(>0)$ $B = (-ay+cy)(-aycx+axcy)$ $C = (-by+cy)(-bycx+bxcy)(>0)$. (Expression 7)

By solving Expression 7 with respect to the elastic coefficient kc of the control arm Aco, Expression 8 can be obtained.

$$kc < \frac{kakbA}{-kaB-kbC}\left(\text{when } kb < -\frac{kaB}{C}\right)$$ (Expression 8)

Figure 6:
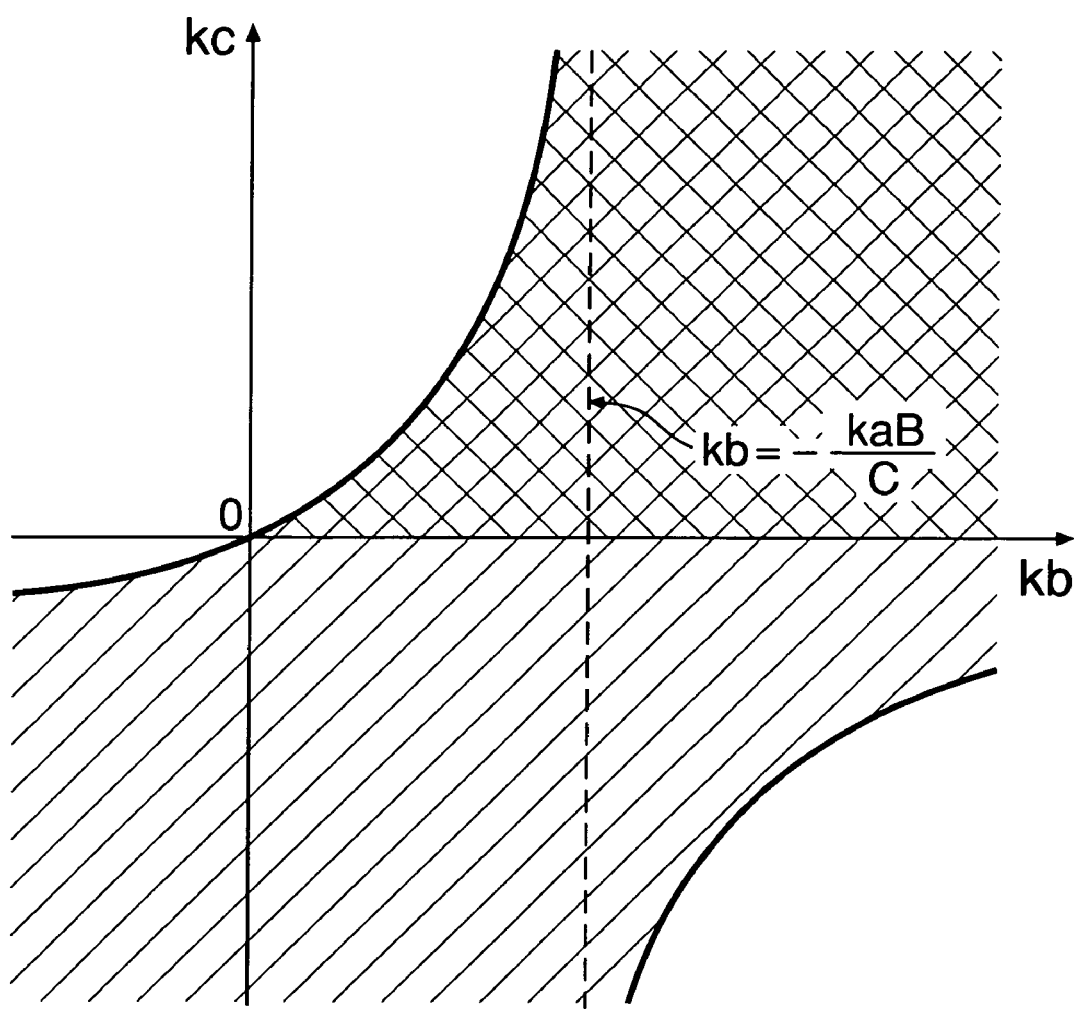
FIG. 6 is a graph showing a region of elastic coefficients in which the pneumatic trail is always positive.

FIG. 6, shows by hatching, a region that satisfies the conditions of Expression 8. In this region, the area beneath the abscissa does not exist in reality because kc<0. Therefore, in the area above the abscissa, shown by double-hatching, the caster trail CT being >0 holds to achieve a lateral force toe-in. In practice, since it is difficult to imagine the elastic coefficient kc of the control arm Aco being so small as to be less than −kaB/C, it is possible to make the caster trial CT>0 even if the elastic coefficient kc is set at any realistic value.

Although an embodiment of the present invention has been explained above, the present invention can be modified in a variety of ways without departing from the scope and spirit of the present invention. For example, the embodiment illustrates a multi-link suspension system in which the load in the longitudinal direction of a vehicle body is supported by the trailing arm Atr and the leading arm Ale, but the present invention is also applicable to a trailing arm suspension system in which the load in the longitudinal direction of a vehicle body is supported only by a high rigidity trailing arm Atr, without employing a leading arm Ale.

What is claimed is:

1. A vehicular rear suspension system comprising:
   a knuckle rotatably supporting a rear wheel via an axle;
   a trailing arm which extends from a vehicle body joint in a longitudinal direction of a vehicle body and is connected to the knuckle; and
   first, second and third lateral arms which extend from corresponding first, second and third lateral arm joints on the vehicle body in the lateral direction of the vehicle body and are each connected to the knuckle;
   wherein a straight line passing through a first joint and a second joint intersects a road surface at an intersection point located behind a ground contact point of the rear wheel relative to the longitudinal axis of the vehicle body, the first joint connecting the first lateral arm to the knuckle wherein the first lateral arm is disposed at a vertically higher position relative to the other two lateral arms, the second joint connecting the second lateral arm to the knuckle, wherein the second lateral arm is disposed more forward relative to a longitudinal axis of the vehicle body compared to the other two lateral arms, and wherein elastic coefficients kb, ka, and kc of the first, second and third lateral arms are set so that $kc < kakbA/(-kaB-kbC)$ if $kb < -kaB/C$, and $kc > kakbA/(-kaB-kbC)$ if $kb > -kaB/C$, where kb is a longitudinal elastic coefficient of the first lateral arm including the first joint and the first lateral arm joint at opposite ends thereof, ka is a longitudinal elastic coefficient of the second lateral arm including the second joint and the second lateral arm joint at opposite ends thereof, and kc is a longitudinal elastic coefficient of the third lateral arm including a third joint and the third lateral arm at opposite ends thereof, when, in x-y coordinates having the x-axis extending in the longitudinal direction of the vehicle body and the y-axis extending in a vertical direction of the vehicle body, the coordinates of the first joint are (bx, by), the coordinates of the second joint are (ax, ay), the coordinates of the third joint are (cx, cy), and $A=(-ay+by)(-aybx+axby)$, $B=(-ay+cx)(-aycx+axcy)$ and $C=(-by+cy)(-bycx+bxcy)$ wherein the third joint connects the third lateral arm to the knuckle.

* * * * *